Figure 1:
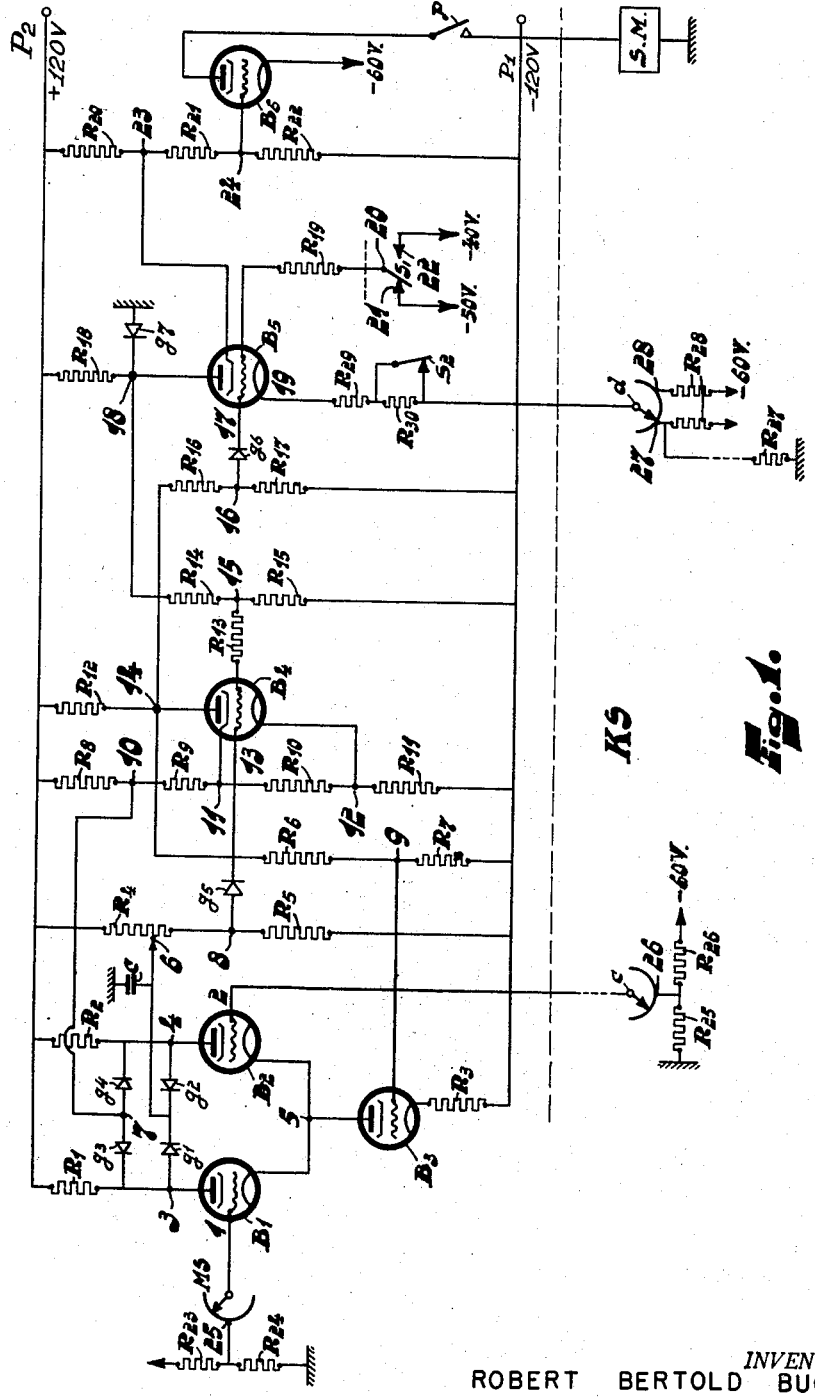

Dec. 22, 1953          R. B. BUCHNER            2,663,760
CONTROL DEVICE FOR USE IN AUTOMATIC SIGNALING SYSTEMS
Filed Oct. 8, 1949                          2 Sheets-Sheet 1

INVENTOR.
ROBERT BERTOLD BUCHNER
BY
AGENT

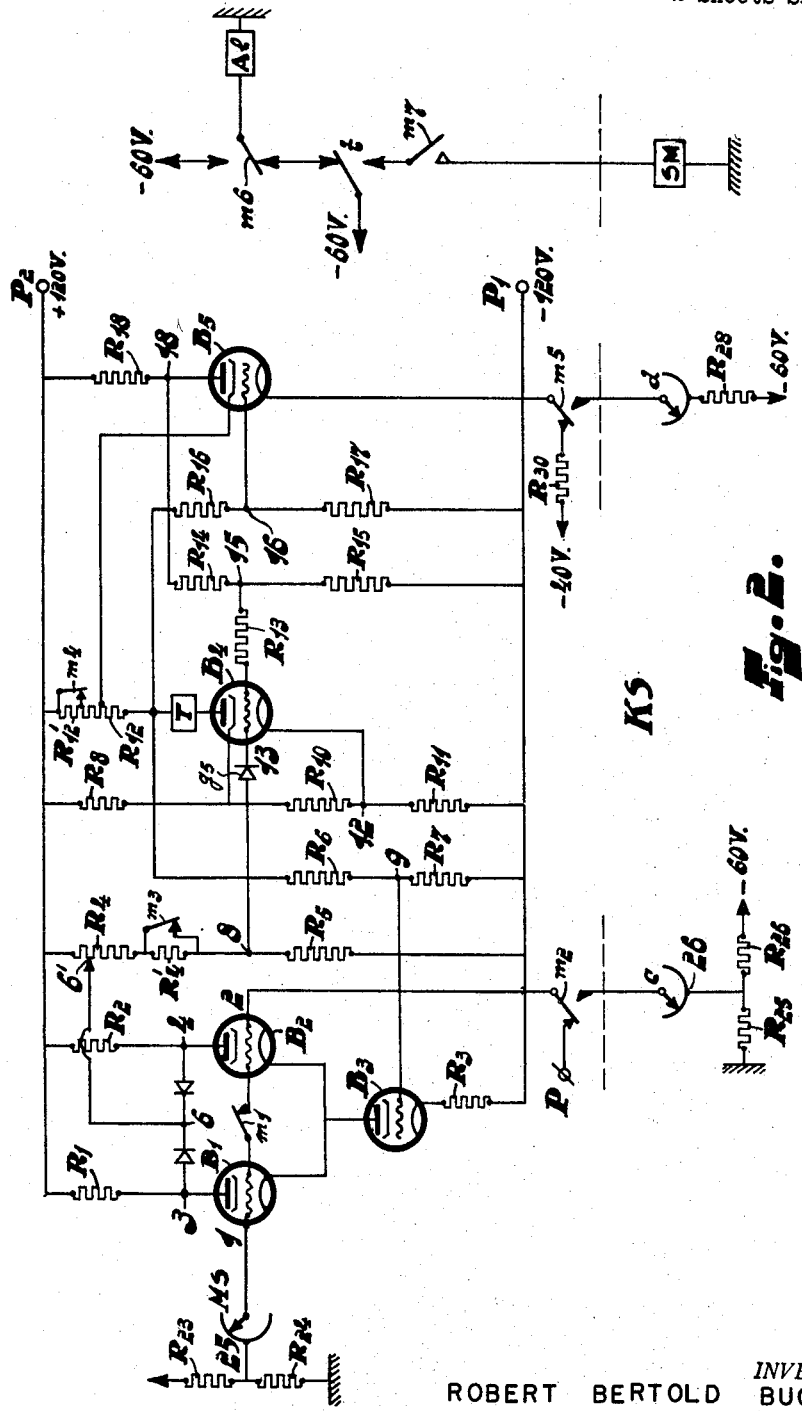

Patented Dec. 22, 1953

2,663,760

UNITED STATES PATENT OFFICE 2,663,760

CONTROL DEVICE FOR USE IN AUTOMATIC SIGNALING SYSTEMS

Robert Bertold Buchner, Eindhoven, Netherlands, assignor to Hartford National Bank and Trust Company, Hartford, Conn., as trustee Application October 8, 1949, Serial No. 120,248

Claims priority, application Netherlands October 12, 1948

3 Claims. (Cl. 179—18)

1

This invention relates to control devices for use in automatic signalling systems, for example in automatic telephone systems, for the numerical adjustment of a switch, a wiper of which moves over marking contacts of the switch being tested to determine whether they are busy or free, the marking contacts of free outlets over which the wiper moves having supplied to them through a resistance a potential lower than the potential of marking contacts of busy outlets.

The use of the device suggested is not restricted to a given system for the numerical adjustment of the switch. It is possible for example, to use the device in conjunction with a register in order that a switch which during the movement sends pulses back to the register, may be positioned from a fixed initial position on an outlet corresponding to the desired number. As an alternative, the device may be used with a voltage comparison method in which the switch is required to be positioned on an outlet of which a contact associated with a second wiper is marked by an electrical condition characteristic of the number corresponding to the outlet, for example an alternating voltage of given amplitude, frequency or phase or a unidirectional voltage of a given value. However, the device according to the invention to be described hereinafter, may be used in other methods of adjustment. As a rule, the device may be associated with or form part of a register.

The present invention provides a device by which it is made substantially impossible for two switches to stop on corresponding outlets at the same time. Circuit-arrangements are known in which the lapse of time interval between the test whether an outlet is free or busy and the marking of the outlet engaged is minimized since the outlet is tested and marked engaged by electronic means.

In a known circuit arrangement, the switch is adjusted by a method in which the direct voltages of marking contacts of the switch are compared by a comparison device with a numerical comparative voltage set in the register. Immediately a marking contact is contacted the marking voltage of which corresponds to the comparative voltage in the register, the comparison device causes a gaseous tube to strike which tube is connected to the wiper and instantaneously alters the marking potential to a potential such that another switch cannot engage this outlet, whereupon the marking contact is permanently connected to earth by means of a relay contact. This method is not very suitable for adjusting final selectors because marking an outlet being engaged has the effect of removing the numerical indication and it is frequently desirable that it should be possible for outlets to be tested regarding certain characteristics even if they are marked engaged, for example whether they pertain to a P. B. X group. Furthermore this arrangement does not permit an operator to effect through clearing of an existing call, for example in order to give priority to a trunk call.

In U. S. copending patent application Serial Number 107,412 filed July 29, 1949, now Patent No. 2,640,883, a control circuit is described in which control electrodes of two discharge tubes are connected to an output circuit of the other tube so as to permit of the tubes cutting one another off, i. e. so that they form a trigger circuit. On the control device being connected into circuit, the wiper over which the busy criterion is to be tested is connected to the cathode of that one of the tubes which is cut off at that instant. Immediately an outlet is reached which satisfies the particular number criterion, the potential of a control electrode of the last-mentioned tube is increased, under the control of a testing device testing this number criterion, to a value such that the tube remains cut off if the outlet is busy the cathode being in this case sufficiently positive relative to the control electrode to prevent current flow through the tube, but the tube becomes conducting if the outlet is free. The decrease in anode potential of this tube causes the other tube to be cut off. This results in the potential of the control electrode of the first tube being further increased so that the first tube becomes highly conducting and a voltage drop occurs across the resistance across which the marking voltage is supplied to the marking contact which is contacted such that the potential of the marking contact becomes approximately equal to that of marking contacts of busy outlets.

This device, similar to the device according to the present invention, is suitable for use in any known adjusting system but does not without further expedients permit throughclearing to be effected.

According to the invention a control-device for use in an automatic signalling system for the numerical adjustment of a switch a wiper of which moves over marking contacts which, when the corresponding outlet is not marked engaged, have supplied to them through a resistance a potential lower than that of marking contacts of busy outlets, said control device being associated with a testing device which responds upon contacting an outlet corresponding to the desired number, is characterised in that on the control device being brought into circuit the wiper is connected to the cathode of a first discharge tube, a control electrode of which is connected to a first point of an output circuit of a second discharge tube such that, so long as the second discharge tube is conducting the first discharge tube remains cut-off when a busy outlet is contacted and becomes conducting to a limited extent only when a free outlet is contacted so that this outlet is not marked busy and if the second discharge tube is cut off, the current traversing the first tube increases to such extent that the potential of the marking contact is increased to a value approximately equal to or higher than that of marking contacts of busy outlets, and that furthermore a control electrode of the second tube is connected to a second point the potential of which is determined by the testing device and to a third point of an output circuit of the first discharge tube such that the control electrode assumes the higher of the potentials of the said points the testing device supplying to the second point a potential such that, if the testing device does not respond and/or the first tube is cut off, the second tube remains conducting, whereas if the testing device does respond and the first tube is conducting to a limited extent, the second tube is cut off, and furthermore provision being made of means which respond to the cutting off of the second tube, or the first tube becoming fully conducting, and which stop the movement of the switch.

The control device may be adapted to enable throughclearing in that provision is made of means permitting the cut off condition of the first tube to be terminated by giving the control electrode of the first tube, so long as the second tube is conducting, a potential such that the first tube also becomes conducting upon contacting definite outlets or all the busy outlets.

The control device lends itself more particularly to use in conjunction with a voltage comparison device described in U. S. copending patent application Ser. No. 107,411, filed July 29, 1949, for controlling a switch according to a direct voltage comparison system in which the second tube of the control device together with the first tube and the tubes of the voltage comparison device constitutes a kind of trigger circuit. Consequently, in this combination circuit the second tube fulfils two functions simultaneously. The two trigger circuits may be transferred from one electrical condition into the other (the second tube being cut off) only if the number criterion is satisfied and in addition the outlet is free.

The invention furthermore provides a method of testing the device regarding its satisfactory operation.

The invention will now be explained more fully with reference to the accompanying diagrammatic drawings in which:

Figs. 1 and 2 each show one embodiment in which a switch KS is adjusted with the use of a voltage comparison system and in which the control device according to the present invention is associated with a voltage comparison device such as is described in U. S. copending patent application Ser. No. 107,411, filed July 29, 1949.

The selector switch KS, which constitutes for example a group selector or a final selector, is here assumed to be a motor rotary switch without a fixed zero position. Fig. 1 shows only wipers $c$ and $d$ the contact associated with the wipers $c$ and $d$ and a rotary magnet SM. The outlets of KS are differentiated numerically in that unidirectional voltages of different value are supplied to the $c$ contacts 26 by means of one or more voltage dividers R25, R26. The outlet contacts of a marking switch MS in the register are supplied, with the use of a voltage divider R23, R24, with different voltages which correspond to the different numerical marking voltages of the $c$-contacts of the switch KS. Dialling signals originating from a subscriber's station cause the wiper of MS to be moved, in a manner not indicated in greater detail, to one of the marking contacts 25. Under the control of the device the switch KS is required to be adjusted to a free outlet of which the numerical $c$-marking contact exhibits a potential equal to that of the wiper of the switch MS.

The busy criterion is tested through the $d$-wiper of the switch KS. The $d$-marking contacts of free outlets 28 are each connected through a resistance R28 to a source of supply say $-60$ volts. The marking contacts of busy outlets (27) of final selectors are connected to earth through the multiple field and a busy switch by way of a resistance R27 so that marking contacts of busy outlets exhibit a potential of $-40$ volts. Marking contacts of busy outlets of group selectors are earthed. The voltage comparison device comprises discharge tubes B1 and B2 the control grids of which, during the control of the switch, are connected to the wiper of the switch MS and the $c$-wiper of the switch KS respectively. The anodes are fed through equal resistance R1 and R2 having equal values.

The common cathode circuit includes a high impedance discharge tube B3, for example a pentode, so that the common emission current of B1 and B2 is substantially independent of the voltages supplied to their control grids. If the voltages at points 1 and 2 are equal, the anodes of tubes B1 and B2 consequently exhibit a substantially constant rest potential. The anodes B1 and B2 are connected through rectifiers $g^1$ and $g^2$ to a point 6 on a voltage divider R4, R5 the potential of the point 6 being a few volts higher than the rest potential of the anodes. The rectifiers $g^1$ and $g^2$ are thus cut off.

If the potentials of the control grids are different and the potential of point 1 is higher than that of point 2, the potential of point 4 is higher than that of point 3. Rectifier $g^2$ is conducting beyond a determined value of the voltage difference and the points 6 and 8 on the voltage divider exhibit potentials which are higher than the rest potentials of these points. The potential of point 8 constitutes a criterion as to the value of the voltage difference between the voltages to be compared. If point 8 assumes the rest potential when the wipers of the switch KS make contact with an outlet contact; a desired outlet is reached. The potential of point 8 exceeds the rest potential in the case of an undesired outlet. In order that during the passage to a subsequent $c$-contact the polarity of the voltage difference of which from point 1 is opposite to that of the preceding contact, the point 8 may be prevented from approximating to the rest potential even though for a very short time, the point 6 is connected to earth through a condenser $c$.

The anodes of tubes B1 and B2 are connected through rectifiers $g^3$ and $g^4$ to a point 10 on a voltage divider R8, R9, R10, R11 of which the potential exceeds the rest potential of the anodes.

If the potential difference between points 1 and 2 exceeds a definite value, the rectifier connected to the anode of the tube passing the higher current becomes conducting so that the anode's potential is limited downwardly. This precaution is taken to prevent one of the tubes from passing grid current and the device from constituting a load on the marking contacts.

The control device proper comprises the tubes B4, B5 and B6. On the control device being brought into circuit the d-wiper of the switch is connected in a manner not indicated in greater detail, if desired through preceding selecting stages, to the cathode of the tube B5. Closure of contact p by electromagnetic means included in the register but not shown herein, results in the rotary magnet SM being energized by the anode current of tube B6 and the switch KS being operated. The tube B5 is cut off at this moment and the tubes B4 and B6 are conducting. The anode supply circuits of tubes B4 and B5 comprise the resistances R12 and R18 respectively. The busy test of the outlets is effected by the tube B5. The control grid of B5 is connected through a rectifier g5 to a tapping point 16 on a voltage divider R16, R17 connected between the anode of tube B4 and a point of supply P1 having a voltage of −120 volts.

As long as tube B4 is conducting, point 16 has a potential of −50 volts. The control grid of tube B5 is furthermore connected through a high ohmic resistance R19 to the contact arm Si of a relay S (not shown) of the register which is energized by an operator if through-clearing is to be effected. It is assumed that the contact arm Si occupies the position shown and engages contact 21 which is connected to a voltage source of −50 volts. Consequently the control grid has a potential of −50 volts. When the wiper of switch KS makes contact with a marking contact of a busy outlet having a potential of 0 volts or −40 volts, the control grid of tube B5 is at a voltage of −50 volts or −10 volts, respectively relative to its cathode and the tube remains cut off. However, on a free outlet (desired or undesired outlet) being reached, tube B5 becomes conducting to a limited extent and the potential of its anode decreases. The potential of the marking contact is increased by some few volts, for example to −47 volts, due to the emission current passing through resistance R28. The increase is limited in that the control grid of tube B5 acquires a negative potential relative to its cathode. Hence the potential of the marking contact remains much lower than the potential of marking contacts of busy outlets and the outlet reached is not made busy under these conditions.

The screen grid and the cathode of tube B4 are connected to the points 11 and 12 of the voltage divider R8, R9, R10, R11. The control grid is connected through a high ohmic resistance R13 to the point 15 on a voltage divider R14, R15 connected between the anode of tube B5 and the point of supply P1 and through a rectifier g5 to the point 8. The rectifier is polarized so that the control grid invariably follows the higher of the potentials of points 8 and 15. If, for example the potential of point 8 exceeds that of point 15, the rectifier is conducting and its resistance is low compared with that of resistance R13. However, if the potential of point 8 is lower than that of point 15, the rectifier constitutes a resistance having a high value compared with that of resistance R13. It is evident that the positions of the resistance and the rectifier may be interchanged. If desired, use may be made of two rectifiers, in which event the control grid must be connected through a leak resistance to a point of negative potential, for example the point P1.

So long as undesired outlets are contacted, the potential of point 8 is high enough for tube B4 to remain completely conducting. When a desired outlet is reached, the potential of point 8 decreases to a value such that the current passing through tube B4 would decrease if the control grid could take over this potential.

The tapping point 15 is chosen so that its potential exceeds the cut off potential of tube B4, if tube B5 is cut off and hence if the outlet is busy, and is lower than the cut off potential if tube B5 is conducting.

Since the control grid of tube B4 follows the higher of the potentials of points 8 and 15, tube B4 remains completely conducting if the outlet reached does not correspond to the desired number and/or if the outlet is busy (that is to say if tube B5 remains cut off). In this case the switch continues to rotate.

Only if a desired free outlet is contacted does the tube B4 become less conducting and the potential of the anode point 14 increases. This results in an increase in potential of the control grid of tube B3, point 9, so that the current passing through tube B3 increases, the potentials of points 6 and 8 are further decreased and tube B4 is completely cut off. Owing to the trigger action of the circuit comprising tubes B3 and B4 the voltage comparison device has a very sharp threshold value or in other words, if the potential difference between the points 1 and 2 exceeds this threshold value, tube B4 remains conducting but if the potential difference is smaller, tube B4 is suddenly cut off completely. At the same time, the potential of the point 16 connected to the anode of B4 increases approximately to earth potential. The rectifier g6 is thus conducting and its resistance has a low value relative to that of resistance R19.

The cathode of tube B5 substantially follows the potential of the control grid so that the outlet is made busy. The potential of the marking contact with which the d-wiper makes contact is now approximately equal to earth potential. When the outlet is definitely marked busy, the potential of the contact is made equal, by means of a relay contact (not shown), to earth potential for a group selector and to −40 volts for a final selector. The switch is stopped by deenergizing the rotary magnet SM at the same time as the outlet is engaged.

The control grid of tube B6 is connected to the tapping point 24 on a voltage divider R20, R21, R22 included between the points of supply P1 and P2 and the screen grid of tube B5 is connected to a second tapping point 23. The cathode of tube B6 has a potential of −60 volts and the point 24, as long as the screen grid current of tube B5 is zero or comparatively low (for example 1 ma.) has a potential relative to the cathode of tube B6 such that, when contact p is closed, tube B6 passes a high current and the rotary magnet SM is energized.

So long as tube B5 is cut off, screen grid current does not flow. If tube B5 is conducting to a limited extent, the major portion of the emission current passes to the anode and the screen grid current is low. If the emission current of tube B5 is increased by raising the control grid potential, the anode potential decreases until it becomes equal to earth potential. With a further increase in emission current, the anode potential cannot decrease below earth potential, because a rectifier g7 connected between the anode, point 18, and earth becomes conducting. The anode current however is capable of increasing slightly further until the cathode potential has increased to a little below earth potential. If the emission current and hence the cathode potential increases still further, the anode current suddenly decreases abruptly and the screen grid current increases to the same extent because the effective positive anode voltage has become so small that the anode no longer attracts the major portion of the emission current. However, the screen grid has a comparatively high positive voltage relative to the cathode. The screen grid current-control grid voltage characteristics curve thus exhibit a sharp kink.

Due to the high increase in screen grid current, the potential of the points 23 and 24 decreases, tube B6 is suddenly cut off and the movement of the switch KS is stopped.

If two switches were to reach corresponding contacts at substantially the same moment, only one of the control devices is capable of responding. This is not only due to the fact that the entire process of testing and marking the outlet engaged is performed within an extremely short period of time but also due to the fact that the two control devices cannot maintain themselves simultaneously in a condition in which tube B5 is completely conducting and tube B4 is cut off. Since in this case each of the tubes B5 would be required to pass about half the current, so that the potentials of the points 18 would decrease to a value at which the tubes would be cut off so that each of the trigger circuits would be in an unstable condition.

The cathode circuit of tube B5 includes a resistance R29 of comparatively low value. Current feedback brought about by resistance R29 permits of eliminating any difference between the tubes B5 in the case of substitution of the tubes.

If an operator wishes to communicate with an engaged subscriber, the contact arm S1 is changed over due to energisation of the relay S, so that the point 29 is connected to a voltage source of —40 volts.

The point 16 exhibits a potential of —50 volts and the rectifier g6 is consequently cut off so that the control grid of tube B5 assumes a potential of —40 volts.

During control of a group selector tube B5 remains cut off upon reaching a busy outlet marked by OV, but when a final selector is adjusted tube B5 becomes conducting not only with free outlets but also with busy outlets marked —40 volts, the point 15 acquiring a potential such as to permit tube B4 to be cut off if this is permitted by the potential of point 8. In this case the operation of the circuit takes place in a manner exactly similar to that described above with reference to the engaging of a free desired outlet.

Until the desired outlet is reached the cathode of tube B5 has a potential which slightly exceeds —40 volts. The d-contacts of undesired free outlets would thus be made busy during the passage of the wiper. In order to avoid this, the cathode circuit of tube B5 includes a resistance R30 shunted by the break contact S2 of the relay S. If through-clearing is to be effected, resistance R30 is connected in series with the cathode circuit of tube B5.

If the resistances R30 and R28 are equal, the potential of a d-contact of a free outlet increases to a value as low as —50 volts so that a control device which at the same time tests the corresponding outlet through a second switch can respond.

In the embodiment shown through-clearing is simplified. The circuit arrangement may, however, be arranged so as to enable through-clearing only for definite existing connections, for example for local connections and not for trunk connections.

The potentials by which the outlets are marked busy may be made dependent upon the importance of the connection passing through an outlet, i. e. the greater the importance of the connection, the higher the potential by which it is marked.

Trunk connections, for example, may be marked with —30 volts and local connections with —40 volts.

Consequently, if the point 20 has a voltage of —40 volts, through-clearing may be possible for a local connection but not for a trunk connection. In order to permit through-clearing for a trunk connection, the point 20 may be connected to a voltage source of —30 volts.

If desired, more than two degrees of importance may be indicated.

The register is preferably designed such that the relay S is not energized until continued rotation of the switch shows that no desired outlet is free, since the switch is thus prevented from stopping on an engaged P. B. X line whilst other lines of the P. B. X group are free.

The circuit arrangement shown in Fig. 2 is similar to that shown in Fig. 1. Like components and points are designated by the same references. For the sake of simplicity the device for through-clearing is omitted from Figure 2. The circuit arrangement comprises a device for testing the satisfactory operation of the control device.

In the circuit arrangement shown in Fig. 2, the rotary magnet of the switch SM is energized in a manner different from that in the arrangement shown in Fig. 1 and the tube B6 is unnecessary.

The anode circuit of tube B4 includes a test relay T. In addition, the control device is associated with a relay M of which the contact arms m1 to m7 and the associated contacts only are shown.

On the control device being brought into circuit the relay M is energized. At this moment of time, tube B4 becomes conducting so that relay T is also energized. This results in the energizing circuit of the rotary magnet SM being closed through the contacts t and m7 and the switch being operated.

The c-wiper of the switch is connected to the control grid of tube B2 by the contact m2. The d-wiper is connected to the cathode of tube B5 by the contact m5.

The outlets are then tested in a manner exactly similar to that described with reference to the circuit shown in Fig. 1. Immediately a free outlet corresponding to the desired number is reached, the outlet is marked busy by the emission current of tube B5 and tube B4 is cut off. This causes the relay T to be de-energized and the energizing circuit of rotary magnet SM to be opened.

The screen grid of tube B5 is connected to a tapping point on the anode resistance R12 of tube B4. It is thus ensured that when the device responds the effective screen grid voltage of tube B5 varies comparatively slightly, since both the potentials of the cathode of tube B5 and of the tapping point on R12 increase when tube B4 is cut off.

Satisfactory operation of the control device is tested for the period of time the device is not operative to control a switch.

By means of back contacts of relay M the device is brought into an electrical condition which corresponds to the condition of the device after a desired free outlet has been engaged, the relay T being required to be de-energized.

The presence of a disturbance is indicated by de-energization of an alarm relay A1 by which further alarm means are caused to become operative. For the period of operation of the control device the relay A1 is energized by way of the contact of a make-before-break contact $m6$ of the relay M. For the period of time the device is not operative, the relay A1 is held through back contact $m6$ and back contact $t$. The control grids of the tubes B1 and B2 of the voltage comparison device are interconnected through back contact $m1$ of relay M. The control grids of tubes B1 and B2 are connected, through the contact $m2$, to a point P having supplied to it a constant voltage or a voltage which varies between the highest and lowest values of the numerical potentials.

The contacts $m3$ and $m4$ short-circuit parts $R_4'$ and $R_{12}'$ of the resistances R4 and R12, which results in a decrease of the threshold value of the difference voltage below which voltage comparison is required to respond.

The cathode of tube B5 is connected through a resistance R30 to a voltage source of —60 volts by way of contact $m5$ of relay M.

Under these conditions the relay T must not be energized. Any disturbance is indicated by de-energization of the relay A1.

The step of decreasing the threshold value of the voltage comparison device ensures that any divergence in equilibrium due to ageing of the tubes is indicated before the divergence gives rise to disturbances in operation.

What I claim is:

1. In an automatic signalling system; the combination comprising a selector switch provided with a series of marking contacts, corresponding outlets and a wiper for said contacts, a resistance connected to each marking contact, means for applying a potential to each marking contact through the related resistance which is lower for a corresponding busy outlet than for a corresponding free outlet, a testing device coupled to said selector switch and operative upon contacting an outlet corresponding to a desired number to produce at its output a decrease potential value, and a control device for the numerical setting of said switch, said control device comprising first and second electron discharge tubes each having a cathode, a control electrode and an anode, respective output circuits connected to the anodes of the first and second tubes, the control electrode of the first tube being connected to a first point in the output circuit of the second tube, means for connecting said wiper to the cathode of said first tube to apply the potential of an engaged contact thereto, circuit means intercoupling said first and second tubes whereby in the condition when the second tube is conductive the first tube remains non-conductive when a busy outlet is contacted and is rendered conductive to a limited extent when a free outlet is contacted so that this outlet is not marked busy, and in the condition when the second tube is non-conductive, current in the first tube increases to an extent at which the potential of the marking contact is increased to a value at least equal to that of the marking contacts of the busy outlets, means connecting the control electrode of the second tube to a second point of potential connected to the output of the testing device and to a third point in the output circuit of the first tube, whereby the control electrode of the second tube assumes the higher of the potentials of said second and third points, said testing device applying to said second point a potential having a value at which in the condition when said testing defice is non-operative and said first tube is non-conductive, the second tube remains conductive, and having a value at which in the condition when said testing device is operative, the first tube is rendered conductive to a limited extent and the second tube is rendered non-conductive, means to actuate said wiper to move over said contacts, and means operated by the full conduction of the first tube to arrest the movement of said wiper.

2. The combination, as set forth in claim 1, further including a rectifier connecting the control electrode of the second tube to the second point, and a resistance of relatively high value connecting the control electrode of said second tube to the third.

3. The combination, as set forth in claim 1, further including an anode supply circuit for said first tube, and a rectifier connected between a point in said anode supply circuit and a point of fixed potential, said rectifier being polarized in a direction that the voltage at the point of the anode supply circuit is limited in the downward direction.

ROBERT BERTOLD BUCHNER.

References Cited in the file of this patent

UNITED STATES PATENTS

| Number | Name | Date |
| --- | --- | --- |
| 2,444,065 | Pouliart | June 29, 1948 |
| 2,454,781 | Deakin | Nov. 30, 1948 |